United States Patent Office 3,394,016
Patented July 23, 1968

3,394,016
ROASTED MEAT FLAVOR AND PROCESS FOR PRODUCING SAME
Douglas Stanley Bidmead, Larchmont, and Christopher Giacino, Upper Nyack, N.Y., and James Douglas Grossman, Elizabeth, and Philip De Coursey Kratz, Rumson, N.J., assignors to International Flavors & Fragrances, Inc., New York, N.Y., a corporation of New York
No Drawing. Filed July 7, 1965, Ser. No. 470,252
23 Claims. (Cl. 99—140)

ABSTRACT OF THE DISCLOSURE

Process of producing edible meat-flavored compositions comprising reacting thiamine or acetylmercaptopropanol in the presence of aliphatic carboxylic acid, and products obtained.

---

This invention relates to novel food flavoring compositions and to processes for producing them, and more particularly, it relates to novel meat flavors and meat flavoring compositions and to the processes for producing them.

Reproduction of the flavor and aroma of meats and meat-based products has been the subject of a long and continuing search by food and fragrance chemists. The severe shortage of foods, especially protein foods, in many parts of the world has given rise to the need for utilizing non-meat sources of proteins and making such proteins as palatable and as meat-like as possible. Hence, flavoring and aromatic materials which will closely simulate or exactly reproduce the flavor and aroma of meats and meat products are urgently needed.

Moreover, there are a great many meat-containing or meat-based foods presently distributed in a preserved form, examples being condensed soups, dried meats, freeze-dried or lyophilized meats, packaged gravies, and the like. These products contain meat or meat extracts, but frequently the fragrance and taste are changed by the various processing operations, and it would be desirable to supplement or enhance the flavors of these preserved meat foods. A good source of meat flavor and aroma would also be highly useful as in element in or supplement to known meat flavoring and aromatic compositions.

An object of this invention is to provide a composition having true meat flavor. The invention further provides a composition having the ability to act either as a base for or as an enhancer for meat flavoring materials.

Another object of this invention is to provide a method for preparing such novel compositions.

Further and more specific objects, features and advantages will clearly appear from the detailed description given below.

The invention comprises the novel compositions and component mixtures comprised in the compositions, as well as the novel processes and steps of processes according to which such compositions can be manufactured, particularly the embodiments which are described herein by way of example only and in accordance with what is now considered the preferred manner of practicing the invention.

Briefly, the compositions of this invention are edible meat-flavored compositions formed by admixing with, adding to, or incorporating in a food the product obtained by reacting a sulfur-containing compound, as hereinafter further described, in the presence of an organic carboxylic acid. The meat flavor composition can be formed in situ during the cooking or other preparation of the food product, or can be partially formed at one stage and reacted to completion at a subsequent stage such as after addition to the food product and during its cooking or other preparation. The process of this invention comprises reacting a sulfur-containing compound in the presence of organic carboxylic acid and adding sufficient to the product to the food. The reaction of the sulfur-containing material in the presence of the carboxylic acid is carried out by heating the two materials together, preferably in a suitable vehicle or liquid reaction medium.

It will be understood that the term-meat-flavored composition as used herein means a material which has a cooked or roasted meat flavor such as beef, pork, chicken, or ham, and is capable of imparting a cooked meat flavor to and enhancing such meat flavors in foodstuffs. The products are characterized by their meat-like flavor. They have food, flavor, or aroma value themselves, and they can be used as such or in the preparation of gravies, soups, and other food products, including non-meat-containing foods, to enhance the flavor thereof.

The sulfur-containing compounds useful in the practice of this invention are 3-acetyl-3-mercaptopropanol-1 (also known as 5-hydroxy-3-mercaptopentanone-2), thiamine (vitamin $B_1$), and materials capable of yielding such compounds under the reaction conditions. When thiamine is utilized, it can be in the form of the free base or preferably as an acid salt. Desirable acid salts are the halogen acid salts, preferably the hydrochloride.

The compositions of this invention are prepared by reacting the sulfur-containing compounds in the presence of the organic carboxylic acids. While it is believed that the theoretical explanation of the reaction is that the sulfur-containing compounds actually react with all or part of the acid molecule, the term "in the presence of" is herein taken to mean only that the acid must be present. The acid could also conceivably produce the flavoring compositions by causing some intermolecular reaction in the sulfur-containing compounds themselves, and this possibility is likewise encompassed by the term.

The organic carboxylic acids suitable for use in the formation of the reaction products can be chosen from a large group of such acids. Generally, the preferred organic acids have equivalent weights in the range of from 45 to about 100. Such organic carboxylic acids, include unsubstituted and hydroxy- and amino-substituted carboxylic acids, and preferably aliphatic carboxylic acids. Carboxylic acids which are at least partially water-soluble and having relatively low equivalent weights are generally found to produce the strongest meat flavors, and are especially desirable for use in this invention. Organic aliphatic carboxylic acids including monocarboxylic acids such as propionic acid, dicarboxylic acids such as oxalic and maleic acid, amino-substituted acids, such as glycine, hydroxy-substituted acids such as citric, and similarly substituted dicarboxylic acids such as glutamic and tartaric acids can be used as the carboxylic acid. Since most of the compositions of this invention are used in foodstuffs, edible non-toxic carboxylic acids are greatly preferred. Examples of such greatly preferred acids are amino acids such as glycine, proline, valine, glutamic acid, and the like; hydroxy-substituted acids such as citric, lactic, tartaric, and the like; and unsubstituted carboxylic acids, such as formic, acetic, propionic, adipic, fumaric, crotonic, and the like. In those instances where inedible carboxylic acids such as oxalic or maleic are used, any residual inedible material must be removed from the flavoring composition.

It will be understood that not only are pure carboxylic acids and carboxylic acids of commercial purity suitable for use in this invention, but mixtures of such acids can also be used. An example of a mixture of carboxylic acids which is useful in this invention is the mixture occurring in protein hydrolysates, preferably carbohydrate-free hydrolysates. Such protein hydrolysates afford an inexpensive source of amino acid mixtures, and many such hydrolysates are available for use in this process. These include animal, fish, and vegetable hydrolysates such as those vegetable hydrolysates obtained from yeast, corn, or wheat. If desired, the protein hydrolysate can be supplemented with one or more of the carboxylic acids disclosed above.

The reaction mixture can additionally contain other materials which aid the desired reaction. An example of materials which aid formation of the meat flavor and improve the yield from the process are certain auxiliary sulfur-containing compounds. Either organic or inorganic auxiliary sulfur materials can be added, and the auxiliary sulfur compounds can be sulfur-containing amino acids liberating hydrogen sulfide under the reaction conditions, or can be lower alkyl mercaptans, lower alkyl sulfides, lower alkyl disulfides, hydrogen sulfide itself, or inorganic compounds designated by the formula $MS_x$, where M is an alkali-metal, an alkaline earth metal, or ammonium, and $S_x$ is sulfide or sulhydrate.

When hydrogen sulfide or a lower alkyl mercaptan is used, the amounts are controlled so as to avoid overpowering the aroma of the product with the mercaptan or sulfide aroma. Generally, it is desirable to use from about 0.1 to about 1 part of auxiliary sulfur compounds for each 100 parts of the total mixture, including the vehicle. The lower alkyl mercaptans and sulfides preferably contain one to six carbon atoms, while the alkyl groups of the lower alkyl disulfide preferably contain from one to about three carbon atoms.

Methionine can be used as an auxiliary sulfur-containing material, especially for pork-flavored compositions. The inorganic auxiliary sulfur-containing compounds include sodium sulfhydrate and sodium sulfide. Instead of the sodium compounds, corresponding compounds of potassium, calcium, ammonium, or substituted ammonium can be used.

Organic auxiliary sulfur compounds useful in the practice of this invention in addition to cysteine and cystine are methyl mercaptan, propyl mercaptan, dimethyl sulfide, dimethyl disulfide, and ethyl methyl sulfide.

Other materials can be added to enhance or accelerate the reaction or to provide a neutral base for the flavors. For example, salts such as sodium chloride can be added to the reaction mixture.

The pH of the initial mixture can be varied over wide limits in the process to obtain the meat flavor compositions. Because of the nature of the reactants, it will be understood that the pH will normally lie within the acidic range, and it is desirable to maintain the pH at a value between about 3.5 and about 7.0. It is especially preferred that the pH of the reaction mixture lie between about 4.5 and 5.5, since optimum results are often obtained at about a 4.75 pH. The pH can be adjusted to desired values with additives, although it is preferred to adjust the pH with the acidic material producing the reaction product.

The reaction can be carried out over a wide range of temperature and other reaction conditions. Generally, it is preferred to use a liquid medium to facilitate the reaction. The liquid reaction medium, or vehicle, can be aqueous or it can be non-aqueous, such as a lipid material. Examples of a satisfactory non-aqueous reaction media are a fat which can be a hydrogenated oil or a natural fat or mixtures such as a combination of fat and flour, and other lipid-based media can also be utilized. When the reaction medium is primarily lipid in character, temperatures in the range of from about 180° F. to about 350° F. are conveniently used.

For aqueous reaction media, temperatures in the range of from about 180° F. to about 225° F. are desirable and temperatures in the range of from about 200° F. to about 220° F. are preferred. With such aqueous reaction media, it is especially preferred to conduct the reaction under reflux conditions.

The time of the reaction can likewise be varied over a range to obtain the novel compositions of this invention. In general the time will depend upon a variety of factors, including the nature of the reactants, temperature, pressure, and nature of the medium or vehicle, if any. The times ordinarily range from a few minutes to about ten hours. For a product to be employed in a mixture or a food which is additionally heated before consumption, only a very short heating cycle is required. In such event, a time as short as 15 minutes can be used. Likewise, where a lipid vehicle is used, higher temperatures are conveniently attainable and the reaction can in some cases be carried out in a matter of minutes. In aqueous media, it is preferred that the time be in the range of from about 15 minutes to about six hours. The best properties of the compositions are often brought out by permitting them to age for from about two to about four days after the heat treatment, but such aging is not essential.

The proportion of carboxylic acid to sulfur-containing substance can be widely varied. Thus, it is possible to use quantities of carboxylic acid ranging from about one-quarter the weight of the sulfur material to about fifty times the weight of the sulfur material. It is desirable to utilize from about three-quarters to about forty times as much carboxylic acid as sulfur material to produce the greatest flavor intensity per unit weight, and the ratio of about 1:1 to about 40:1. It will be understood that the higher ratios of carboxylic acids to sulfur material are utilized when a crude acid mixture is involved, such as that obtained from protein hydrolysates. Where relatively pure carboxylic acids are utilized the ratio is preferably from about 1:1 to about 4:1. Unless otherwise indicated, all parts, proportions, percentages, and ratios herein are by weight.

Where aqueous reaction media are employed, a large excess of water is desirably used. Varying amounts of water, for example from about one to about ten times as much water as reactants, can be used. After heat treatment and any subsequent aging, the water can be at least partially evaporated to provide more concentrated liquid compositions, or it can be almost entirely removed to produce solid, edible compositions.

The compositions can be employed in liquid form, for example as dispersions, solutions and emulsions, or they can be utilized in the form of dried products. Drying can be accomplished by any convenient means, such as roller drying, flash-drying, freeze-drying and the like, and spray drying is particularly effective.

The following examples are given to illustrate preferred embodiments of the invention as it is now preferred to practice it. It will be understood that these examples are illustrative. The invention is not to be considered as restricted thereto except as indicated in the appended claims.

Example I

A mixture of 8.8 g. of cysteine-hydrochloride, 8.8 g. of thiamine hydrochloride, and 309.4 g. of carbohydrate-free vegetable protein hydrolysate is brought to a standard weight of 1000 grams by the addition of water, and adjusted to 4.75 pH with acid or base as required. This mixture is then boiled under reflux conditions at atmospheric pressure for four hours and allowed to cool. The reaction mixture so obtained has good roasted meat flavor quality.

For material which is to be employed in a food which will be retorted, the time of four hours in this example can be reduced to fifteen minutes.

If a dried solid product is desired, 15 parts of gum arabic are added to a quantity of the liquid reaction product of Example I containing 85 parts of solids, and the gum arabic-containing mixture is spray-dried to obtain a dry solid material having a good roasted meat flavor quality.

Example II

The following ingredients are refluxed for four hours, aged for three days, and spray-dried to produce a dry solid having a beef flavor. Before spray drying one part of sodium chloride is added.

| Ingredient: | Parts |
|---|---|
| L-cysteine hydrochloride | 1.71 |
| Carbohydrate-free vegetable protein hydrolysate | 28.63 |
| Thiamine hydrochloride | 1.71 |
| Water | 67.95 |

Example III

A mixture of 4.4 g. sodium sulfide, 8.8 g. thiamine hydrochloride, and 309.4 g. carbohydrate-free vegetable protein hydrolysate is brought to the standard weight of 1000 g. with water, pH-adjusted, and reacted as in Example I. The reaction product has a good roasted meat flavor.

Example IV

A mixture of 8.8 g. thiamine hydrochloride and 309.4 g. carbohydrate-free vegetable protein hydrolysate is brought to the standard weight of 1000 g. with water, pH-adjusted, and reacted for a four-hour period by boiling under reflux conditions while passing gaseous hydrogen sulfide through the mixture. The reaction product has a good roasted meat flavor.

Example V

A mixture of 8.3 g. methionine, 8.8 g. thiamine hydrochloride, and 309.4 g. carbohydrate-free vegetable protein hydrolysate is brought to the standard weight of 1000 g. with water, pH-adjusted, and reacted as in Example I. The reaction product possesses a good roasted meat flavor.

Example VI

A mixture of 8.8 g. thiamine hydrochloride and 309.4 g. carbohydrate-free vegetable protein hydrolysate is brought to the standard weight, pH-adjusted, and reacted as in Example I. The reaction product possesses a good roasted meat flavor.

Example VII

A mixture of 8.8 g. cysteine hydrochloride, 8.8 g. thiamine hydrochloride, 309.4 g. carbohydrate-free vegetable protein hydrolysate, and 100 g. dextrose is brought to the standard weight, pH-adjusted, and reacted as in Example I. A roasted meat flavor is obtained which is not as smooth as that obtained in Example I.

Example VIII

A mixture of 4.4 g. sodium sulfide, 8.8 g. thiamine hydrochloride, and 7.2 g. aspartic acid is brought to the standard weight, pH-adjusted, and reacted as in Example I. A roasted meat flavor is obtained in the reaction product.

Example IX

A mixture of 4.4 g. sodium sulfide, 8.8 g. thiamine hydrochloride, and 36.8 g. glutamic acid is brought to the standard weight with water, pH-adjusted, and reacted as in Example I. A reaction product having a roasted meat flavor is obtained.

Example X

A mixture of 4.4 g. sodium sulfide, 8.8 thiamine hydrochloride, and 5.5 g. proline is brought to the standard weight with water, pH-adjusted, and reacted as in Example I. A product having a roasted meat flavor is obtained.

Example XI

A mixture of 3.7 g. ethyl mercaptan, 8.8 g. thiamine hydrochloride, and 309.4 g. carbohydrate-free vegetable protein hydrolysate is brought to the standard weight with water, pH-adjusted, and reacted as in Example I. A reaction product having a roasted meat flavor is obtained.

Example XII

A mixture of 0.034 g. ethyl mercaptan, 8.8 g. thiamine hydrochloride, and 309.4 g. carbohydrate-free vegetable protein hydrolysate is brought to the standard weight with water, pH-adjusted, and reacted as in Example I. A product with a good roasted meat flavor almost as good as that of Example I is obtained.

Example XIII

A mixture of 50 micrograms of hydrogen sulfide in the form of a saturated aqueous solution, 8.8 g. thiamine hydrochloride, and 309.4 g. carbohydrate-free vegetable protein hydrolysate is brought to the standard weight with water, pH-adjusted, and reacted as in Example I. The same sort of roasted meat flavor is obtained as in Example XII.

Example XIV

A mixture of 0.051 g. ethyl sulfide, 8.8 g. thiamine hydrochloride, and 309.4 g. carbohydrate-free vegetable protein hydrolysate is brought to the standard weight with water, pH-adjusted, and reacted as in Example I. The resulting meat flavor is the same as that obtained in Example XII.

Example XV

A mixture of 0.026 g. methyl disulfide, 8.8 g. thiamine hydrochloride, and 309.4 g. carbohydrate-free vegetable protein hydrolysate is brought to the standard weight with water, pH-adjusted, and reacted as in Example I. The resulting meat flavor is the same as that obtained in Example XII.

Example XVI

The following ingredients are refluxed for four hours, aged for three days, and spray dried to produce a solid product having a beef flavor. Before drying, sufficient gum arabic is added to provide a composition containing 0.5 part gum arabic and one part flavor solids.

| Ingredient: | Parts |
|---|---|
| L-cysteine hydrochloride | 1.32 |
| Carbohydrate-free vegetable protein hydrolysate | 44.05 |
| Thiamine hydrochloride | 1.32 |
| Beta-alanine | .50 |
| Water | 53.31 |

Example XVII

A mixture of 8.8 g. thiamine hydrochloride, 36.8 g. glutamic acid, and 100 g. sodium chloride is adjusted to pH 4.75, brought to the standard weight with added water, and reacted as in Example I. The product has a good, meaty roasted flavor.

Example XVIII

The procedure of Example XVII is repeated, but the pH is adjusted to a value of 5.69 to dissolve all of the glutamic acid. After reaction as in Example XVII, a good, meaty roasted flavoring product is obtained.

Example XIX

A mixture of 8.8 g. thiamine hydrochloride, 11 g. glutaric acid, and 100 g. sodium chloride is brought to the standard weight with water, pH-adjusted, and heated as in Example I. A reaction product having a good roasted meat flavor is obtained.

Example XX

A mixture of 8.8 g. thiamine hydrochloride, 20 g. citric acid, and 100 g. sodium chloride is brought to the standard weight with water, pH-adjusted, and reacted as in Example I. A product having a roasted meat flavor is obtained.

Example XXI

A mixture of 8.8 g. thiamine hydrochloride, 20 g. lactic acid, and 100 g. sodium chloride is brought to the standard weight with water, pH-adjusted, and reacted as in Example I. A product having a roasted meat flavor is obtained.

Example XXII

A mixture of 8.8 g. thiamine hydrochloride, 20 g. glycine, and 100 g. sodium chloride is brought to the standard weight with water, pH-adjusted, and reacted as in Example I. A reaction product having a roasted meat flavor is obtained.

Example XXIII

A mixture of 8.8 g. thiamine hydrochloride, 20 g. valine, and 100 g. sodium chloride is brought to the standard weight with water, pH-adjusted, and reacted as in Example I. A product having a roasted meat flavor is obtained.

Example XXIV

A mixture of 8.8 g. thiamine hydrochloride, 4.8 g. α-aminobutyric acid, and 100 g. sodium chloride is brought to the standard weight with water, pH-adjusted, and reacted as in Example I. A product having a roasted meat flavor is obtained.

Example XXV

A mixture of 8.8 g. thiamine hydrochloride, 20 g. glutamic acid, and 100 g. sodium chloride is brought to the standard weight with water, pH-adjusted, and reacted as in Example I. A product having good roasted meat flavor is obtained.

Example XXVI

A mixture of 8.8 g. thiamine, 20 g. adipic acid, and 100 g. sodium chloride is brought to the standard weight with water, the pH is adjusted to 4.75, and the mixture is boiled under reflux conditions for four hours to form a reaction mixture as in Example I. A product having a good roasted meat flavor is obtained.

Example XXVII

A mixture of 8.8 g. thiamine, 20 g. succinic acid, and 100 g. sodium chloride is brought to the standard weight, pH-adjusted, and reacted as in Example XXVI. A product having a good roasted meat flavor is obtained.

Example XXVIII

A mixture of 8.8 g. thiamine hydrochloride, 36.8 g. glutamic acid, 4.4 g. sodium sulfide, and 100 g. sodium chloride is brought to the standard weight with water, pH-adjusted, and reacted as in Example I. A good roasted meat flavor is obtained in the reaction product.

Example XXIX

A mixture of 20 g. glutaric acid, 8.8 g. thiamine, 4.4 g. sodium sulfide, and 100 g. sodium chloride is brought to the standard weight with water, pH-adjusted, and reacted as in Example I. A reaction product having good roasted meat flavor is obtained. When compared with the same compositions made without added sodium sulfide, the composition of this example is found to have a more intense meat flavor.

Example XXX

A mixture of 20 g. lactic acid, 8.8 g. thiamine, 4.4 g. sodium sulfide, and 100 g. sodium chloride is brought to the standard weight with water, pH-adjusted, and reacted as in Example I. A good roasted meat flavoring composition is obtained. It is found that a substantially more intense flavor is obtained in the composition of this example than in a similar composition prepared without the sulfide.

Example XXXI

A mixture of 20 g. succinic acid, 8.8 g. thiamine, 4.4 g. sodium sulfide, and 100 g. sodium chloride is brought to the standard weight with water, pH-adjusted, and reacted as in Example I. A product having a good roasted meat flavor is obtained, and it is found that this meat flavor is more intense than the flavor obtained from a similar composition without the addition of the sulfide.

Example XXXII

A mixture of 20 g. acetic acid, 8.8 g. thiamine, 4.4 g. soidum sulfide, and 100 g. sodium chloride is brought to the standard weight with water, pH-adjusted, and refluxed for four hours as in Example I. A product having a good roasted meat flavor is obtained.

Example XXXIII

A mixture of 20 g. propionic acid, 8.8 g. thiamine, 4.4 g. sodium sulfide, and 100 g. sodium chloride is brought to the standard weight, pH-adjusted, and reacted as in Example XXXII. A product having a roasted meat flavor is obtained.

Example XXXIV

A mixture of 20 g. oxalic acid, 8.8. g. thiamine, 4.4 g. sodium sulfide, and 100 g. sodium chloride is brought to the standard weight, pH-adjusted, and reacted as in Example XXXII. Any residual or unreacted oxalic acid is removed. A product having good roasted meat flavor is obtained.

Example XXXV

A mixture of 20 g. malonic acid, 8.8. g. thiamine, 4.4 g. sodium sulfide, and 100 g. sodium chloride is brought to the standard weight, pH-adjusted, and reacted as in Example XXXII. A good meat flavoring composition is obtained.

Example XXXVI

A mixture of 20 g. tartaric acid, 8.8 g. thiamine, 4.4 g. sodium sulfide, and 100 g. sodium chloride is brought to the standard weight with water, pH-adjusted, and reacted as in Example XXXII. A meat flavor is obtained, and this flavoring is many times as intense as when tartaric acid is used in the absence of sodium sulfide.

Example XXXVII

A mixture of 20 g. glycine, 8.8 g. thiamine, 4.4 g. sodium sulfide, and 100 g. sodium chloride is brought to the standard weight with water, pH-adjusted, and reacted as in Example XXXII. A composition having a good meat flavor is obtained, the flavor being much stronger than when the glycine is used in the absence of sodium sulfide.

Example XXXVIII

A mixture of 5 g. 3-acetyl-3-mercaptopropanol-1, 36.8 g. glutamic acid, 4.4 g. sodium sulfide, and 100 g. sodium chloride is brought to the standard weight with water, pH-adjusted, and reacted as in Example XXXII. A product having meat flavor is obtained.

Example XXXIX

To ascertain the effect of excluding oxygen, a mixture of 8.8 g. thiamine hydrochloride, 36.8 g. glutamic acid, and 4.4 g. sodium sulfide is brought to a total weight of 1000 g. with water, pH-adjusted, and boiled under reflux conditions for four hours under a nitrogen blanket to form a reaction product. A good roasted meat flavor is obtained, and there is no obvious difference between the flavor of this material and the composition obtained from the same ingredients in an oxygen-containing atmosphere.

Example XL

A mixture is prepared by combining 3.8 g. of a 40% methanolic solution of 3-acetyl-3-mercaptopropanol-1 with 20 g. acetic acid, 100 g. sodium chloride, and 4.4 g. sodium sulfide. Sufficient water is added to bring the total mass to 1000 g. and the pH is adjusted to 4.75. The mixture is reacted by boiling under reflux conditions for four hours. A product having a good roasted meat flavor is obtained. Before use in a food or with a food the methanol is removed. In a preferable alternate method, an ethanolic solution of the acetylmercaptopropanol is used.

Example XLI

A mixture is prepared by combining 3.8 g. of a 40% methanolic solution of 3-acetyl-3-mercaptopropanol-1, 20 g. formic acid, 100 g. sodium chloride, and 4.4 g. sodium sulfide and bringing the total mass to 1000 g. by the addition of water. The pH is adjusted to 4.75, and the mixture is boiled under reflux conditions for four hours to provide a reaction product. The reaction product has a good roasted meat flavor.

Example XLII

A mixture is prepared by combining 3.8 g. of a 40% methanolic solution of 3-acetyl-3-mercaptopropanol-1, 20 g. acetic acid, and 100 g. sodium chloride, and then the mixture is brought to the standard weight by adding water, pH-adjusted, and reacted as in Example I. The reaction mixture has a good roasted meat flavor.

Example XLIII

A mixture is prepared by combining 3.8 g. of a 40% methanolic solution of 3-acetyl-3-mercaptopropanol-1, 309.4 g. carbohydrate-free vegetable protein hydrolysate, and 8.8 g. cysteine hydrochloride, and adding sufficient water to bring the total mass to 1000 g. The mixture is then pH-adjusted, and reacted as in Example I, and a composition having a good roasted meat flavor is obtained.

Example XLIV

A mixture is prepared by combining 3.8 g. of a 40% methanolic solution of 3-acetyl-3-mercaptopropanol-1, 20 g. fumaric acid, 4.4 g. sodium sulfide, and 100 g. sodium chloride, and the total mass is brought to 1000 g. by the addition of water, pH-adjusted, and reacted as in Example I. A good roasted meat flavor is obtained.

The foregoing example utilizing fumaric acid gives very good yields, and it will be understood that other unsaturated carboxylic acids, such as maleic and crotonic, can also be used with good results.

Example XLV

The following ingredients are refluxed for four hours—

| Ingredient: | Parts |
|---|---|
| L-cysteine hydrochloride | .88 |
| Carbohydrate-free vegetable protein hydrolysate | 30.94 |
| Thiamine hydrochloride | .88 |
| Water | 67.30 |

The resulting mixture is then aged for three days and an aliquot portion is withdrawn and dried. Based on the weight of the dry solid obtained, sufficient gum arabic is added to the batch to provide a composition containing one part by weight of gum arabic. The composition is spray dried to produce a beef-flavored product.

Example XLVI

The following ingredients are refluxed for three hours—

| Ingredient: | Parts |
|---|---|
| L-cysteine hydrochloride | 5.44 |
| Thiamine hydrochloride | 5.06 |
| Carbohydrate-free vegetable protein hydrolysate | 15.19 |
| Water | 50.05 |
| Palmitic acid | .35 |
| Glutamic acid | .53 |
| Potassium chloride | .44 |
| Dibasic potassium phosphate | .35 |
| Dibasic ammonium phosphate | 2.11 |
| Phosphoric acid | .30 |
| Calcium lactate | .18 |

The mixture is cooled and 20.00 parts alcohol is added. The liquid product obtained thereby has an intense beef flavor.

Example XLVII

A beef bouillon cake formulation is made containing the ingredients listed, in the amounts shown—

| Ingredient: | Gms./unit |
|---|---|
| Salt | 1.80 |
| The spray dried flavor of Example XLV | 0.50 |
| Gelatin (180 bloom) | 0.40 |
| Mono-sodium glutamate | 0.20 |
| Brown coloring | 0.01 |
| Garlic powder | 0.04 |
| Pepper, ground | 0.01 |

A bouillon cube will weigh from 4 to 5 grams. One cube is used with 6 ounces of boiling water.

Example XLVIII

A beef gravy is made by formulating a gravy flavor composition of the ingredients and in the amounts indicated—

| Ingredient: | Gms./unit |
|---|---|
| Cornstarch | 10.50 |
| The spray dried product of Example XLV | 3.00 |
| Caramel color | .30 |
| Garlic powder | .05 |
| White pepper | .05 |
| Salt | 1.92 |
| Mono-sodium glutamate | .20 |

To one unit of gravy flavor concentrate, 8 ounces of water are added, and the mixture is stirred thoroughly to disperse the ingredients; brought to a boil, simmered for one minute, and served. This "meatless" gravy shows excellent beef flavor.

Example XLIX

A soup is made by adding 22 ounces of water to the recipe given in Example XLVIII for the gravy.

Example L

A shaker composition for enhancing the flavor of meats is prepared from a variety of flavors. A powdered composition to enhance a ham flavor is made of—

| Ingredient: | Percent composition |
|---|---|
| Ham spices | 2.5 |
| Mono-sodium glutamate, fine grind | 2.5 |
| Salt, fine grind | 55.0 |
| The spray dried flavor of Example XLV | 40.0 |

Example LI

A beef noodle soup is prepared by mixing together—

| Ingredient: | Gms./unit |
|---|---|
| Salt | 5.00 |
| The spray dried flavor of Example XLV | 3.00 |
| Gelatin (180 bloom) | 1.00 |
| Mono-sodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for five minutes, and is then ready to serve.

It will be appreciated from the foregoing disclosure and examples that the reaction products of this invention can be used to impart a meat-like flavor to meatless edible compositions and can be used to enhance the flavor of meat-containing compositions. The compositions of this invention can be incorporated in foods such as soups and soup mixes, casserole dishes, canned and frozen vegetables, animal and pet foods, sauces, gravies, stews, simulated meat products, meat spreads and dips, bakery products, and replacements for meat extracts and the like. In these applications the flavor composition of this invention can be used alone, and it is frequently combined with other food additive ingredients or constituents to impart special characteristics. Such ingredients include carriers, thickeners, condiments, spices, encapsulating agents, vehicles, coloring agents, flavoring materials, flavor intensifiers, and the like. For example, the compositions of this invention can be admixed with other food additive constituents such as alginates, allspice, ascorbic acid, basil, capsicum extract, cloves, eugenol, onion oil, oregano extract, pyroligneous acid, sage oil, sodium citrate, thyme and the like.

Carriers are useful in extending the flavor of the compositions when they are utilized in dried forms. Such carriers do not appreciably affect the quality of the flavor, but they frequently stabilize the compositions and increase their shelf life. Saccharides such as gum arabic are useful for this purpose, as are mixtures of salts and suitable carbohydrates such as karaya, tragacanth, carboxymethylcellulose and the like.

To prepare compositions according to this invention, the reaction product is admixed with the food in small amounts effective to impart a roasted meat flavor and aroma to the compositions. In practice, the amount of reaction product to be used will vary over a wide range according to the type of product desired, individual preferences of the user, and conditions under which the reaction product is to be added to or used with the food. Generally, it is desirable to use from about 0.5 percent to about 20 percent on a dry weight basis of the product in the finished composition. It is preferred in many uses that the reaction product comprise from about 5 to about 10 percent of the composition.

What is claimed is:

1. An edible composition comprising a food and an amount effective to impart a roasted meat flavor and aroma to the composition of the product obtained by reacting a sulfur-containing material selected from the group consisting of 3-acetyl-3-mercaptopropanol-1 and thiamine in the presence of an aliphatic carboxylic acid other than protein hydrolysate.

2. The composition of claim 1 wherein the carboxylic acid is an edible non-toxic acid.

3. The composition of claim 1 wherein the aliphatic carboxylic acid has an equivalent weight of from about 45 to about 100.

4. The composition of claim 1 wherein the carboxylic acid is selected from the group consisting of unsubstituted acids, hydroxy-substituted acids, and amino-substituted acids.

5. The composition of claim 1 wherein the acid is glutamic acid.

6. The composition of claim 1 wherein the acid is acetic acid.

7. The composition of claim 1 wherein the acid is lactic acid.

8. The composition of claim 1 wherein the acid is tartaric acid.

9. An edible composition comprising a food and an amount effective to impart a roasted meat flavor and aroma to the composition of the product obtained by reacting a sulfur-containing material selected from the group consisting of 3-acetyl-3-mercaptopropanol-1 and thiamine in the presence of an aliphatic carboxylic acid other than protein hydrolysate and an auxiliary sulfur-containing compound selected from the group consisting of sulfur-containing amino acids liberating hydrogen sulfide under the reaction conditions, lower alkyl mercaptans, lower alkyl sulfides, lower alkyl disulfides, hydrogen sulfide, and inorganic compounds designated by the formula $MS_x$, where M is selected from the group consisting of alkali-metal, alkaline earth metal, and ammonium, and $S_x$ is selected from the group consisting of sulfide and sulfhydrate.

10. The composition of claim 9 wherein the acid has an equivalent weight of from about 45 to about 100.

11. The composition of claim 9 wherein the acid is selected from the group consisting of unsubstituted acids, amino-substituted acids, and hydroxy-substituted acids.

12. A process for making an edible composition which comprises adding to a food a small amount effective to impart a roasted meat flavor and aroma to the composition of the reaction product obtained by reacting a sulfur-containing material selected from the group consisting of 3-acetyl-3-mercaptopropanol-1 and thiamine in the presence of an aliphatic carboxylic acid other than protein hydrolysate.

13. The process of claim 12 wherein the acid is an edible non-toxic acid.

14. The process of claim 12 wherein the acid has an equivalent weight of from about 45 to about 100.

15. The process of claim 12 wherein the acid is selected from the group consisting of unsubstituted acids, amino-substituted acids, and hydroxy-substituted acids.

16. The process of claim 12 wherein the acid is glutamic acid.

17. The process of claim 12 wherein the acid is acetic acid.

18. The process of claim 12 wherein the acid is lactic acid.

19. The process of claim 12 wherein the acid is tartaric acid.

20. A process for making an edible composition which comprises adding to a food a small amount effective to impart a roasted meat flavor and aroma to the composition of the reaction product obtained by reacting in an aqueous vehicle at a pH in the range of from about 3.5 to about 7 a sulfur-containing material selected from the group consisting of 3-acetyl-3-mercaptopropanol-1 and thiamine in the presence of an aliphatic carboxylic acid other than protein hydrolysate at a temperature of from about 180° to about 225° F. for from about fifteen minutes to about ten hours.

21. A food flavoring composition comprising (1) the product obtained by reacting a sulfur-containing material selected from the group consisting of 3-acetyl-3-mercaptopropanol-1 and thiamine in the presence of an aliphatic carboxylic acid other than protein hydrolysate, and (2) at least one food additive constituent selected from the group consisting of carriers, thickeners, encapsulating agents, vehicles, coloring agents, condiments, flavoring materials, and flavor intensifiers.

22. An edible composition comprising a food and an amount effective to impart a roasted meat flavor and aroma to the composition of the product obtained by heating a mixture consisting essentially of 3-acetyl-3-mercaptopropanol-1 or thiamine and carbohydrate-free protein hydrolysate.

23. A process for making an edible composition which comprises adding to a food a small amount effective to impart a roasted meat flavor and aroma to the composition of the reaction product obtained by heating a mixture consisting essentially of 3-acetyl-3-mercaptopropanol-1 or thiamine and carbohydrate-free protein hydrolysate.

No references cited.

A. LOUIS MONACELL, *Primary Examiner.*

H. H. KLARE III, *Assistant Examiner.*